United States Patent [19]

Pappalardo et al.

[11] Patent Number: 4,594,178
[45] Date of Patent: Jun. 10, 1986

[54] PROCESS FOR PRODUCING A YELLOW EMITTING PHOSPHOR

[75] Inventors: Romano G. Pappalardo, Sudbury; John Walsh, Milford, both of Mass.

[73] Assignee: GTE Laboratories Incorporated, Waltham, Mass.

[21] Appl. No.: 713,578

[22] Filed: Mar. 18, 1985

Related U.S. Application Data

[63] Continuation of Ser. No. 511,603, Sep. 12, 1983, abandoned, which is a continuation of Ser. No. 373,330, Apr. 30, 1982, abandoned.

[51] Int. Cl.$^4$ .................................. C09K 11/463
[52] U.S. Cl. .................................. 252/301.4 P
[58] Field of Search .................. 252/301.4 P; 313/486

[56] References Cited

U.S. PATENT DOCUMENTS 3,014,874 12/1961 Ranby ..................... 252/301.4 P

OTHER PUBLICATIONS

Henderson et al., "J. of the Electrochem. Soc., " vol. 104, No. 10, 1957, pp. 612-615.

*Primary Examiner*—Jack Cooper
*Attorney, Agent, or Firm*—Ivan L. Ericson

[57] ABSTRACT

Yellow emitting fluorescent lamp phosphors comprise cerium and manganese activated calcium-strontium fluoroapatite compositions represented by the approximate formula

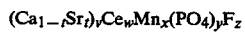

$(Ca_{1-t}Sr_t)_v Ce_w Mn_x (PO_4)_y F_z$ wherein
t is from 0 to 1
v is from about 4.12 to about 4.30
w is about 0.295
x is from about 0.147 to about 0.295
y is about 3.0
z is from about 1.72 to about 2.21.

An improved two step firing process for producing the disclosed phosphors is described and an improved fluorescent lamp employing the disclosed phosphors is also described.

2 Claims, 2 Drawing Figures

PROCESS FOR PRODUCING A YELLOW EMITTING PHOSPHOR

This is a continuation of application Ser. No. 511,603, filed Sept. 12, 1983, which is a continuation of application Ser. No. 373,330 filed Apr. 30, 1982, both now abandoned.

CROSS REFERENCE TO RELATED APPLICATION

A co-pending patent application, Ser. No. (D-23,144), filed concurrently herewith, entitled "Ce-Mn Coactivated Fluoroapatite Phosphors as the Yellow Emitting Component for High Efficacy Lamp Blends, Process for Producing Same and a Fluorescent Lamp Containing Same" by Thomas E. Peters and Romano G. Pappalardo, and assigned to GTE Laboratories Incorporated, assignee of the present application, concerns related subject matter of this application.

FIELD OF THE INVENTION

This invention relates to alkaline earth fluorophosphate luminescent materials. More particularly, it relates to calcium-strontium fluoroapatite phosphors activated with cerium and manganese and to fluorescent lamps incorporating these phosphor materials.

BACKGROUND OF THE INVENTION

British Pat. No. 792,598 to Ranby and corresponding *J. Electrochemical Soc.*, Vol. 104, No. 10 (October 1957) pp. 612–615, article entitled "Cerium-Activated Halophosphate Phosphors" by S. T. Henderson and P. W. Ranby disclose a luminescent material comprising a halophosphate of calcium and/or strontium, having an apatite structure activated with cerium or with cerium and manganese, and the phosphor materials of optimum brightness being formulated as:

$$Sr_{4.57}Ce_{0.2}Mn_{0.25}(PO_4)_{3.05}F_{5.2}.$$

It has been found that the optimum brightness is not at the Henderson and Ranby formulation.

SUMMARY OF THE INVENTION

In accordance with one aspect of the present invention, there is provided an improved luminescent composition comprising a cerium and manganese activated calcium-strontium fluoroapatite composition having the approximate formula $$(Ca_{1-t}Sr_t)_v Ce_w Mn_x (PO_4)_y F_z$$

wherein
 t is from 0 to 1
 v is from about 4.12 to about 4.30
 w is about 0.295
 x is from about 0.147 to about 0.295
 y is about 3.00
 z is from about 1.72 to about 2.21.

In another aspect of the invention, a fluorescent lamp comprising a light-transmitting envelope has electrodes, an inert ionizable gas and a charge of mercury therein and a coating of phosphor on the inside surface of the envelope. The phosphor comprises a cerium and manganese activated calcium-strontium fluoroapatite composition having the approximate formula $$(Ca_{1-t}Sr_t)_v Ce_w Mn_x (PO_4)_y F_z$$

wherein
 t is from 0 to 1
 v is from about 4.12 to about 4.30
 w is about 0.295
 x is from about 0.147 to about 0.295
 y is about 3.00
 z is from about 1.72 to about 2.21.

In still another aspect of the invention, a process for producing cerium and manganese activated calcium-strontium fluoroapatite luminescent material composition comprises firing the composition for about 1 to about 5 hours at about 900° C. to about 1050° C. in about 10 l/minute flow of $N_2$, then refiring the material composition for about 1 hour at about 850° C. to about 1025° C. in 10 l/minute flow of $N_2$.

In a further aspect of this invention, a process for producing cerium and manganese activated calcium-strontium fluoroapatite luminescent material composition comprises firing the material composition for about 1 to about 1.5 hours at about 950° C. to about 980° C. in about 10 l/minute flow of $N_2$ containing 5% $H_2$ and then refiring the material composition for about 1 hour at about 850° C. to about 1025° C. in about 10 l/minute flow of $N_2$.

For a better understanding of the present invention, together with other and further objects, advantages and capabilities thereof, reference is made to the following disclosure and appended claims in connection with the above-described drawings.

DETAILED DESCRIPTION OF THE PREFERRED EMBODIMENT

Figure 1:
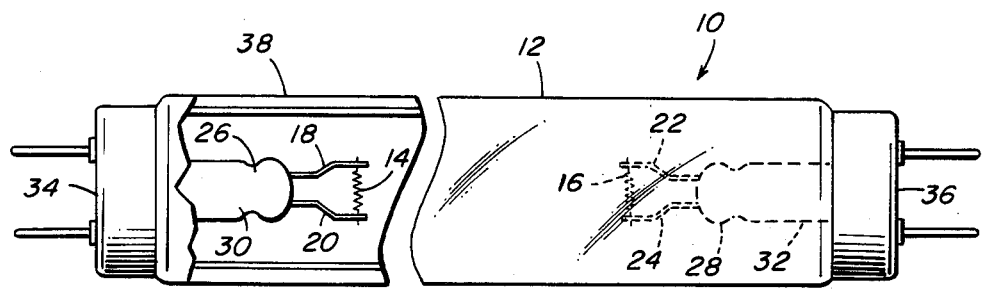
FIG. 1 is a view of a fluorescent lamp, partially in section, diagrammatically illustrating an embodiment of the invention.

Referring now to the drawings with greater particularity, there is shown in FIG. 1 a fluorescent lamp 10. Lamp 10 comprises an elongated sealed glass envelope 12 of circular cross section. It has the usual electrodes 14 and 16 at each end supported by lead-in wires 18, 20 and 22, 25, respectively, which extend through glass presses 26, 28 in mount stems 30, 32 to the contacts in bases 34, 36 affixed to the ends of the lamp 10.

Envelope 12 is filled with an inert gas such as argon or a mixture of argon and neon at a low pressure, for example, two torr, and a small quantity of mercury, at least enough to provide a low vapor pressure of about six microns during operation.

The interior of envelope 12 is coated with a layer of phosphor 38 of the present invention.

A phosphor coating suspension was prepared by dispersing the phosphor particles in a water base system employing polyethylene oxide as the binder with water as the solvent.

The phosphor suspension was applied in the usual manner of causing the suspension to flow down the inner surface of envelope 12 and allowing the water to evaporate, leaving the binder and phosphor particles adhered to the envelope 12 wall. The phosphor coated envelope 12 was then heated in a lehr oven to volatilize the organic components, the phosphor layer 38 remaining on the envelope 12 wall.

Envelope 12 is processed into a fluorescent lamp by conventional lamp manufacturing techniques.

Figure 2:
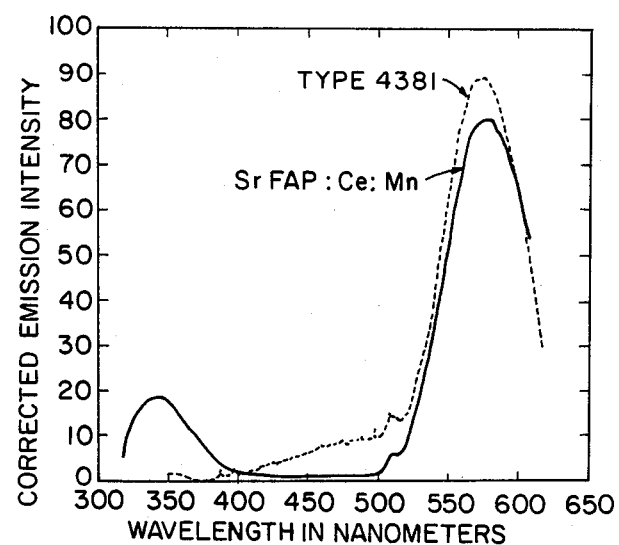
FIG. 2 shows the emission spectrum for phosphor compositions in accordance with one aspect of the present invention and a type 4381 standard emission spectrum.

There is particular interest, for lamp applications, in a sensitizer of the yellow emission from $Mn^{2+}$ that, in turn, does not itself emit in the visible region of the spectrum. $Ce^{3+}$ would be such a Mn-sensitizer in the apatite structure. Spectral and compositional properties of Ce-Mn-coactivated apatite phophors have been reported in the above-mentioned article by S. T. Henderson and P. W. Ranby. The crucial question concerning practical applications for such materials is whether the Mn emission intensity for excitation at 254 nm is comparable to that of the yellow-emitter presently used in high efficacy lamps, namely, the commercial Sylvania type 4381 phosphor, an antimony manganese calcium fluoroapatite, having a typical emission spectra as shown in FIG. 2. In this connection, it has been found that the intensity of the Mn emission in the Ce-Mn coactivated fluoroapatites is a very sensitive function not only of formulation, but also of firing treatment. The most intense Mn emission (for excitation at 254 nm) from a Sr fluoroapatite phosphor coactivated with Ce and Mn is 89% to 90% of the corresponding Mn emission intensity of the commercial type 4381. The Sr fluoroapatite phosphor coactivated with Ce and Mn was obtained from a material formulated as $$Sr_{4.32}Ce_{0.3}Mn_{0.25}(PO_4)_{3.05}F_{1.95};$$

namely, with a strong excess of fluoride. The firing treatment was as follows: 1 hour at 950° C. in a 10 l/minute flow of nitrogen gas containing 5% hydrogen. After the first firing, the material was ground, sieved through a 100-mesh screen, and refired at 1025° C. for 1 hour in an atmosphere of flowing nitrogen (10 l/minute).

The starting reaction components were:
SrHPO$_4$: 8.4 grams
SrCO$_3$: 1.65 grams
SrF$_2$: 0.99 gram
CeF$_3$: 0.887 gram
MnCO$_3$: 0.43 gram The reaction components were weighed and blended in a Spex Mixer-Mill Model 8000. The blend was then loaded in shallow alumina boats ($\simeq 2.5'' \times 1.5'' \times \frac{5}{8}''$) provided with loose quartz covers, and lots of four to six boats were introduced into the hot zone of a quartz tube inserted in a tubular furnace. The atmosphere in the reaction zone was purged of oxygen by a preliminary pump-down, and then continuously swept at 10 l/minute flow of nitrogen gas, or nitrogen gas containing 5% hydrogen. After the firing treatment at the desired temperature, the quartz tube containing the boats was allowed to cool to $\simeq 450°$ C., still under constant gasflow. The quartz tube was then removed and the samples extracted. The materials from this first firing were then ground, sieved (generally through a 100-mesh screen) and then refired. The second firing was carried out in inert or mildly reducing atmosphere, and increased the emission efficiency of the phosphors by a few percent.

An increase in Mn content over 0.15 formula units produced marked sintering after the first firing at temperatures ranging from 950° C. to 1050° C. The use of a nitrogen/hydrogen mixture (5% hydrogen) as firing atmosphere reduced the tendency to sintering and eliminated the pale-green body color frequently observed in the nitrogen-fired phosphors. The second firing was carried out in nitrogen atmosphere at temperatures ranging from 850° C. to 1025° C. Third firing of the phosphor at 850° C. in "wet" forming gas (95% nitrogen/5% hydrogen) resulted in a slight discoloration of the powder and in a 7% brightness loss.

The highest brightness was observed in a phosphor formulated as $$Sr_{4.32}Ce_{0.3}Mn_{0.25}(PO_4)_{3.05}F_{1.95}.$$

Fluorescent lamp brightness of fluorescent lamps containing the above phosphor was 2350 lumens per 40 watts.

A gradient in emission brightness was observed in the doubly-fired material from this run, the measured peak intensity of Mn ranging from 86.1% to 89.8% of the corresponding quantity for a standard type 4381.

X-ray diffraction measurements on the materials obtained from a variety of runs showed a major phase with hexagonal apatite lattice. A possible minor phase of CePO$_4$ was suggested by the diffraction data.

Materials formulated as $$Sr_{4.32}Ce_{0.3}Mn_{0.25}(PO_4)_{3.05}F_{1.95}$$

gave on analysis (by neutron activation, by atomic absorption and by gravimetry) the following elemental composition in percent-weight:

| Sr | Ce | Mn | P | O | F |
|---|---|---|---|---|---|
| 49.50 | 6.10 | 1.80 | 12.80 | 29.40 | 4.3 | corresponding to the molar ratio—4.175 to 0.32 to 0.24 to 3.39 to 1.67 as shown in the following formula $$Sr_{4.175}Ce_{0.32}Mn_{0.24}(PO_{3.39})_3F_{1.67}.$$

In other words, the fluorine content retained was well in excess of the stoichiometric amount for a conventional SrFAP.

The Ca analogs of the Ce-Mn fluoroapatites require a stronger halide excess and higher firing temperatures. The material with most intense Mn emission, formulated as $$Ca_{4.17}Ce_{0.3}Mn_{0.25}(PO_4)_3F_{3.2},$$

was fired 1 hour at 1050° C. in 10 l/minute flow of nitrogen gas containing 5% hydrogen, and refired 1 hour at 950° C. in the same type of atmosphere. The intensity of the Mn emission band was 77% of the type 4381 standard.

The corresponding formulation was:
CaHPO$_4$: 7.74 grams
CaCO$_3$: 1.75 grams
CeF$_3$: 0.88 gram
MnCO$_3$: 0.43 gram
NH$_4$HF$_2$: 0.98 gram FIG. 2 shows a comparison of the emission spectra of the type 4381 standard and of the analogous Ce-Mn activated Sr fluoroapatite. Excitation in all cases was at 254 nm.

While there has been shown and described what is at present considered the preferred embodiment of the invention, it will be obvious to those skilled in the art that various changes and modifications may be made therein without departing from the scope of the invention as defined by the appended claims.

What is claimed is:

1. A process for making a yellow emitting fluorescent lamp phosphor comprising the following steps:

Step-1 firing a mixture of $SrHPO_4$, $SrCO_3$ $SrF_2$, $CeF_3$ and $MnCO_3$ formulated as $Sr_{4.32}Ce_{0.3}Mn_{0.25}(PO_4)_{3.05}F_{1.95}$ for about 1 hour at about 950° C. in about 10 liters/minute flow of $N_2$ containing about 5% $H_2$ to form a fired material;

Step-2 grinding said fired material from Step 1 to form a ground fired material;

Step-3 sieving said ground fired material from Step 2 to form a sieved-ground fired material; and Step-4 firing said sieved-ground fired material from Step 3 for about 1 hour at about 1025° C. in about 10 liters/minute flow of $N_2$ to form said yellow-emitting phosphor.

2. A process for making a yellow emitting fluorescent lamp phosphor comprising the following steps:

Step-1 firing a mixture of $CaHPO_4$, $CaCO_3$, $CeF_3$, $MnCO_3$ and $NH_4HF_2$ formulated as $Ca_{4.17}Ce_{0.3}Mn_{0.25}(PO_4)_{3.0}F_{3.2}$ for about 1 hour at about 1050° C. in about 10 liters/minute flow of $N_2$ containing 5% $H_2$ to form a fired material; and Step-2 firing said fired material from Step 1 for about 1 hour at about 950° C. in about 10 liters/minute flow of $N_2$ containing 5% $H_2$ to form said yellow emitting phosphor.

* * * * *